May 21, 1929.   L. E. WHITON   1,713,804
CHUCK
Filed Jan. 11, 1927   5 Sheets-Sheet 1
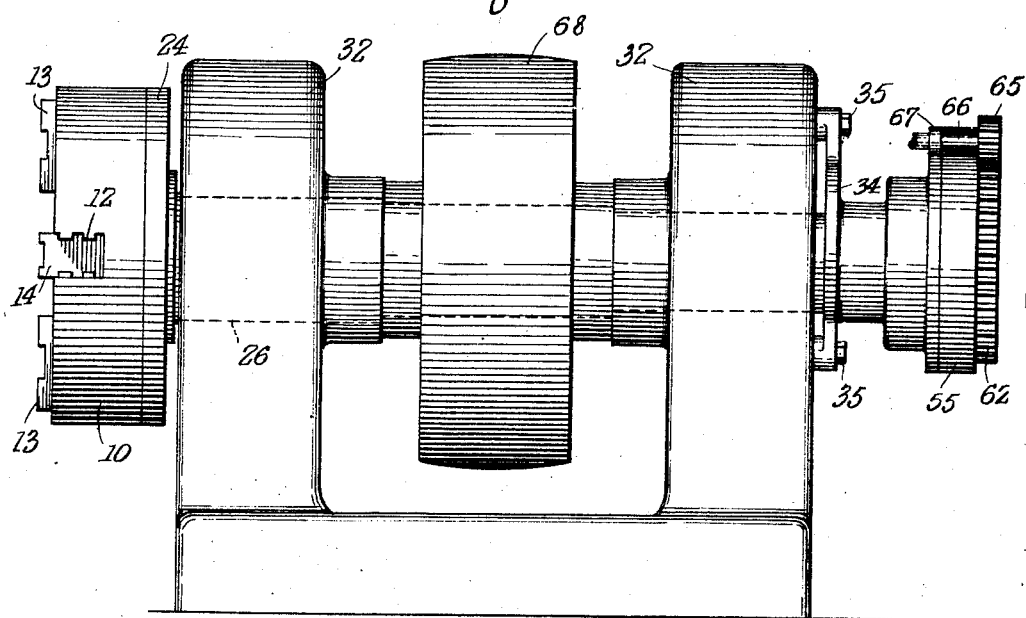
Fig. 1.
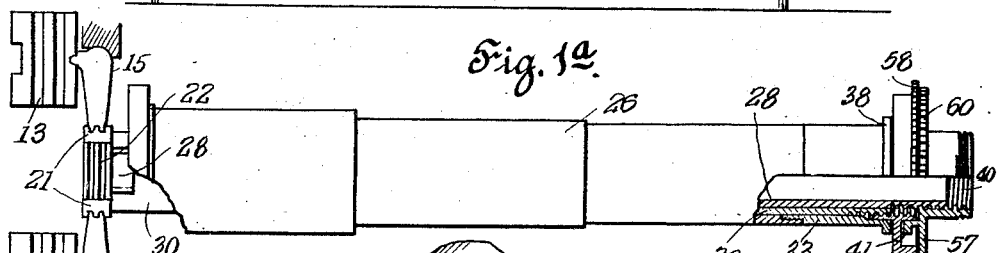
Fig. 1ª.
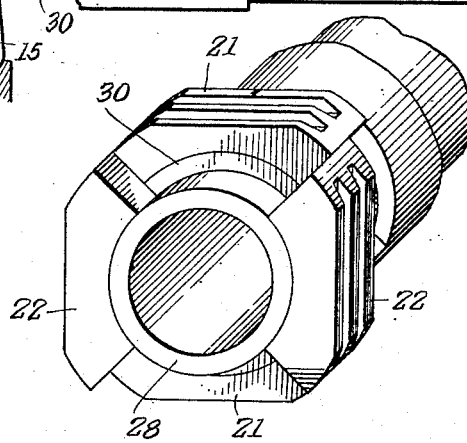
Fig. 2.

May 21, 1929.  L. E. WHITON  1,713,804
CHUCK
Filed Jan. 11, 1927  5 Sheets-Sheet 2

INVENTOR
Lucius E. Whiton
BY
ATTORNEY

May 21, 1929.　　　　L. E. WHITON　　　　1,713,804
CHUCK
Filed Jan. 11, 1927　　　5 Sheets-Sheet 4

INVENTOR
Lucius E. Whiton
BY
ATTORNEY

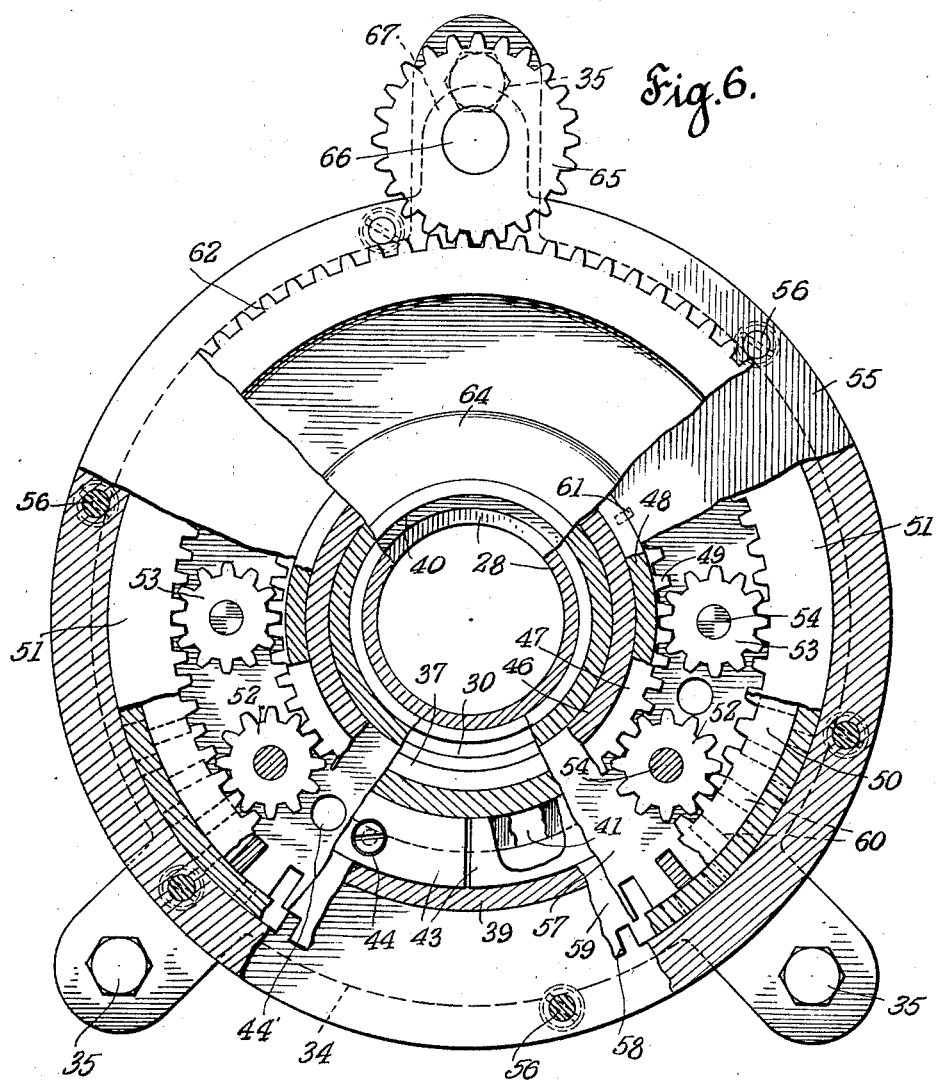

Patented May 21, 1929.

1,713,804

UNITED STATES PATENT OFFICE.

LUCIUS E. WHITON, OF NEW LONDON, CONNECTICUT.

CHUCK.

Application filed January 11, 1927. Serial No. 160,447.

My present invention relates to improvements in the constructions of applications #880,177, filed February 13, 1926 and #148,466, filed November 15, 1926.

One object of my present invention is to provide a compact reliable construction adapted for gripping irregular or elliptical pieces and automatically equalizing the pressure of the various jaws.

Another object is to provide a construction of this character in which powerful gripping action can be applied quickly thru short distances.

Another object is to provide a construction of this character in which the adjustment of the jaws can be effected while the chuck is rotated or stationary, as the case may be.

Another object is to provide a construction of this character which will permit the stock to be treated or the tools to be used to be fed thru the chuck.

In carrying out the invention in its preferred form, I provide a chuck body which may be of any conventional or desirable form, but having two pairs of jaw members. These jaw members are movable radially by means of levers supported in the chuck body, and the levers are operated by racks carried by tubes mounted concentrically within the lathe spindle. At the other end of the lathe spindle, I provide a differential planetary gear mechanism for operating these tubes.

Fig. 1 is a side view of a construction embodying the improvements of my invention, the drawing being on a small scale.

Fig. 1ª is a side view showing the main spindle and associated parts.

Fig. 2 is a perspective view on a larger scale, showing the racks and tubes by which the jaw members are adjusted.

Fig 6 is an end view of the parts shown in Fig. 5, looking from the right—some of the parts being broken away and others shown in section.

Figure 3:
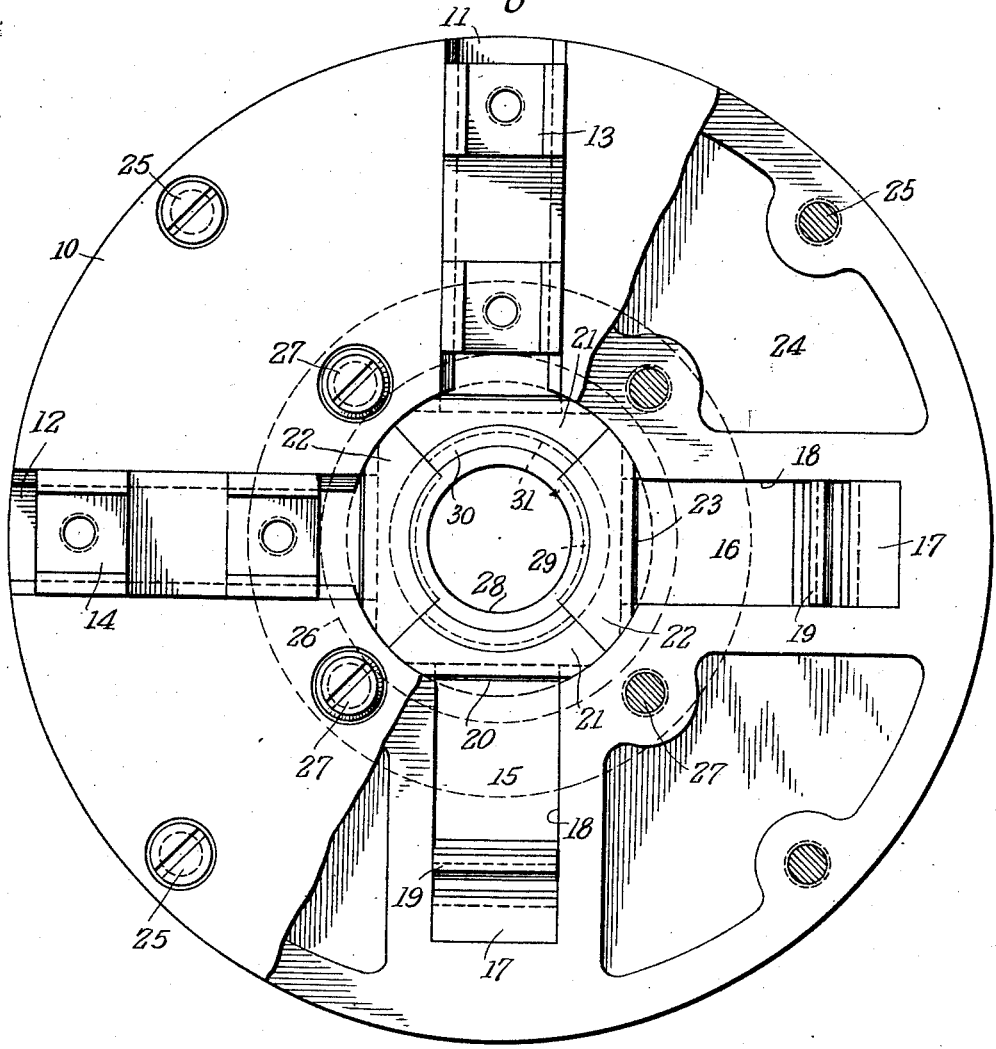
Fig. 3 is a face view of the chuck, parts being omitted and other parts being broken away.

The chuck body 10 may be formed in a suitable manner and provided with pairs of guideways 11 and 12 in which pairs of jaw members 13 and 14 are adjustable. It will be obvious that any desirable form of jaw may be secured to the jaw members as is common in this art.

The jaw members are adjusted or movable radially by means of levers such as 15 and 16. Each lever is supported in a bearing 17 which is seated in a recess 18 in the chuck body. Each lever has a tooth 19 which is geared to the back of its jaw members so that as the lever is rocked in its bearing the jaw member moves radially in or out, as the case may be. The long arm of the lever is provided with one or more teeth 20 which mesh with teeth in a rack 21. The racks 21—21 are geared or connected to the levers 15—15. Racks 22—22 are similarly geared or connected to the levers 16—16 by the teeth 23. These rack members are supported on each other and movable only along lines parallel to the axis of the chuck and guided in the recess 10ª.

The back of the chuck body is closed by a plate 24 which is held in place by screws 25 which pass thru the parts of the chuck body. The main spindle 26 is hollow and secured to the chuck body by a number of screws 27.

The tube or spindle 28 is mounted within the main spindle and provided with means of connection with the rack members 22—22 such as mortise and tenon members 29. Another tubular spindle 30 is divided at its end so as to fit between the racks 22—22 and provided with tongue and groove connections 31 with racks 21—21. Thus the members 26, 30 and 28 are provided with suitable means for causing them to rotate together but permitting members 28 and 30 to move longitudinally with respect to the spindle 26 so as to move the pairs of levers 15—15 and 16—16 respectively.

The rack members 21 and 22 are preferably fitted to each other on radial planes spaced 90° apart, and they are so dimensioned that they are maintained in contact with each other thruout their entire range of normal action and, therefore, cannot become disengaged.

The levers 15 and 16 are so designed with respect to the bearings 17, the jaw members and the rack members that the thrust of the jaw members is received when the jaws are being closed upon the external surface of a piece to be held by the outer shoes 17 within the chuck body. When the jaws are opened against the internal surface of work to be held, the levers thrust against the slidable central racks 21 and 22.

The short arms of the levers or segments 15 have their pitch lines in the back of the jaw members and the long arms of these members 15 and 16 bear against the pitch lines of the central sliding racks. This arrangement prevents distortion due to the compression strain when the jaws are being operated.

The headstock 32 which supports the main spindle 26 may be of any suitable construction, depending largely upon the means provided for driving the spindle and chuck. Preferably, an extension frame 34 is provided for housing the differential gear mechanism by which the tubes 28 and 30 are operated. This housing extension 34 is preferably detachably secured to the main housing, for instance, by means of bolts or screws 35 so as to facilitate manufacture, assembly and separation of the parts.

Preferably, the main spindle 26 is provided with an extension 33 which is screwed into the counter bored and threaded recess in the rear end of the main spindle 26. The tubular member 30 is provided with a screw thread 36, on which the threaded portion of the sleeve or actuating member 37 is mounted. The extension 33 is provided with a flange 38 adjacent the web portion 39 of the sleeve member 37. The other tubular member 28 is also provided with a screw thread on which the sleeve 40 fits. The threads on the two tubes 28 and 30, however, are reversely directed, as will hereinafter be understood. The sleeve member 40 is provided with a flange 41 adjacent the web 39 of the sleeve member 37. Segmental rings 42 and 43 are provided which are secured to the web member 39 by means of bolts or screws 44. Suitable packing 45 may be provided on opposite sides of the flanges 38 and 41 to take up the longitudinal thrust when the parts are in operation.

On the sleeve 40 is mounted another ring or sleeve 46 with teeth 47, forming a spur gear. The ring or sleeve 48 is mounted on ring 46 and provided with teeth 49 forming a spur gear similar to gear 47. Concentric with and surrounding the spur gears are two annular gears 50 and 51. Between the spur gears and annular gears are mounted series of pairs of pinions 52 and 53 each pair being mounted on a short shaft 54 so that the pinions of a pair can rotate independently of each other on their common shaft, but so that each pair can have a planetary movement about the axis of the chuck. These gears are all enclosed by the cap member 55 which forms a part of the frame extension or housing and is held to the frame 34 by screws 56. The sleeve member 40 is provided with a web or disk-like projection 57 opposite the corresponding wall of the cap member 55, so that the pairs of planetary pinions are supported between the members 55 and 57 without requiring any additional support.

The annular gear member 51 is provided with an extension flange having teeth 58 which afford a clutch engagement with similar teeth on the outer edge of an extension 59 from the web 39 of the sleeve member 37 so that the annular gear member 51 and the sleeve member 37 will always rotate together.

The annular gear ring 50 has clutch teeth 60 engaging with corresponding teeth on the web 57 of sleeve 40.

The ring 48 is keyed at 61 to the cap 55 of the housing so that the gear member 49 is always stationary.

An operating member such as a gear wheel 62 is keyed at 63 to the ring 46. This gear wheel 62 may be held in place by a nut 64. The gear wheel 62 may be conveniently rotated in any manner, as for instance, by means of a pinion 65 on a shaft 66 which may be supported in the flange 67 or other bearing in the frame extension or housing 34.

In the operation of the chuck, the spindle 26 is driven in any suitable manner, as for instance, from a pulley 68 or other driving means. It will be understood, of course, that the spur gear ring 48 is held stationary by the cap 55 of the extension housing or frame 34. During the normal operation, the pinion 65 and the gear wheel 62 are also stationary, so that the spur gear ring 46 and its gear teeth 47 remain stationary.

The rotation of the spindle 26 and the chuck body 10 carries with it the rack members 21 and 22 and the tubular members 28 and 30, to which the rack members are secured.

The pressure of the jaws against the work which is held by them is transmitted from the levers 15 and 16, the racks 21 and 22 and the tubes 30 and 28 to the sleeves 37 and 40 respectively, so that these sleeve members rotate with the chuck body and spindles and the annular gear members 50 and 51 are rotated accordingly.

The planetary pinions are accordingly driven idly around the stationary spur gears 47 and 49. When it is desired to adjust the jaw members 13 and 14 inwardly or outwardly, the gear wheel 62 is rotated in one direction or the other, as the case may be, so as to correspondingly rotate the sleeve 46 which is keyed to it and the spur gear 47 which is formed on the end of the sleeve 46. The rotation of the spur gear 47 with respect to the stationary spur gear 49 causes the pinions 52 to rotate with respect to their companions 53 so as to compel the annular gear member 50 to rotate with respect to the annular gear member 51. This produces a relative rotation of the sleeve member 40 with respect to the sleeve member 37 and the corresponding movement of the tube 28 with respect to the tube 30. When the rack members 21 have moved as far as the parts will permit, the movement of the tube 28 longitudinally will necessarily cease, whereupon the sleeve 40 ceases to rotate and the pressure of the planetary pinions will thereupon be transmitted thru the annular gear member 51 to the flange 59 of the sleeve 37 and thereby move the tubular spindle 30 in the same direction as the tube 28 has just been moving. It will be obvious that the direction of the movement of the above described parts will be controlled by the direction of rotation of the gear wheel 62 so that the pressure applied to the jaw members will be equalized when moving inwardly or outwardly even tho the article which is being gripped by the jaw members is considerably larger in one direction than it is in the plane at right angles thereto.

Figure 4:
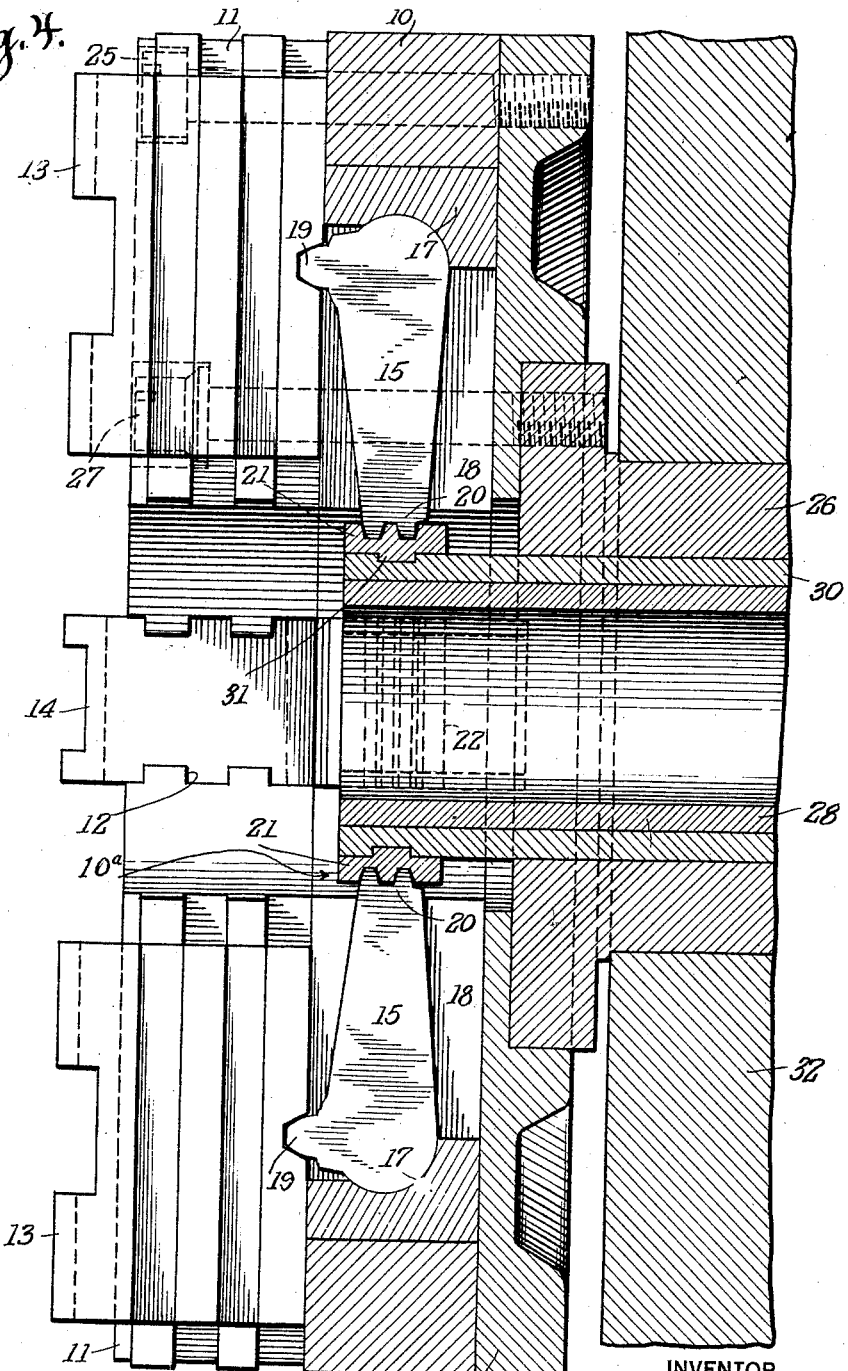
Fig. 4 is a vertical sectional view of the chuck body and a fragment of the supporting housing.
Figure 5:
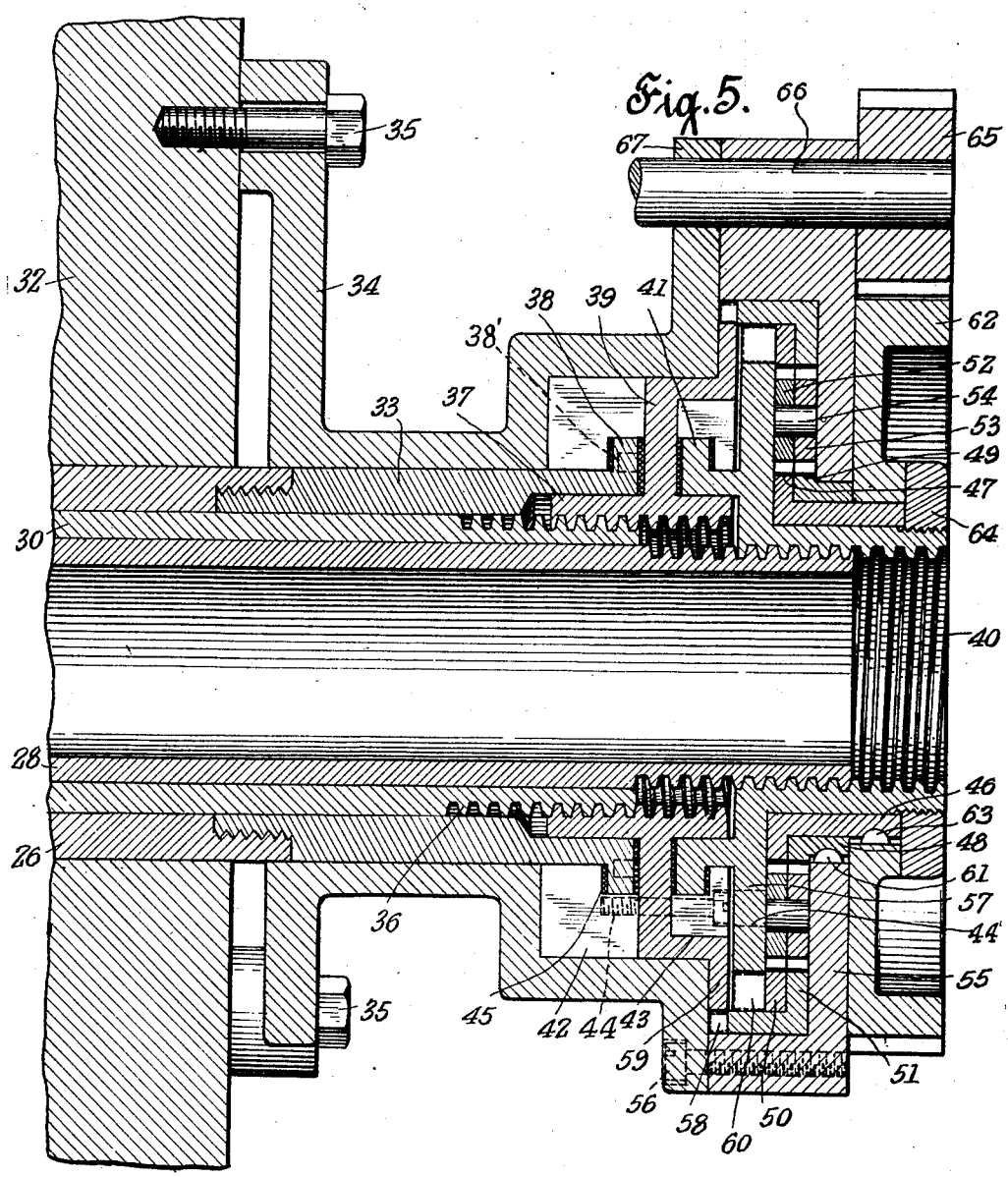
Fig. 5 is a vertical sectional view of the differential planetary mechanism for moving the tubes longitudinally while in rotation.

Altho I have described a highly desirable combination of reversible differential driving mechanism and chuck jaw operating means, it should be understood that the two tubes 28 and 29 may be operated by other means, such as ordinary hydraulic or air-actuated pistons. It should also be understood that while the construction shown in Fig. 4 is the preferred jaw operating mechanism, the reversible differential adjusting mechanism might be connected or geared to the jaw members in other ways. So also, I desire that it be understood that altho it is desirable that the inner member 28 be hollow or tubular in order to permit stock or tools to be adjusted thru the center of the chuck, this inner member might be solid where such central feed is not desired or necessary.

To take the differential gear mechanism apart the nut 64 may be removed, then the gear wheel 62, then the screws 56 and cap 55, then the spur gear rings 46 and 48, then the pinions 53 and 52, and then the annular gear rings 51 and 50.

The screws 44 may then be retracted thru openings 44' in the web 57. Then the sleeve 40 may be unscrewed from the tube 28. The sleeve 37 may then be unscrewed from the tube 30. A forked wrench may then be inserted in the recesses 38' so as to unscrew the extension 33 from the lathe spindle if desired. It will be understood, also, that the chuck body may be removed from the spindle 26 and that the tubes 28 and 30 may be unscrewed from the sleeves 40 and 37 and removed from the left-hand end of the headstock.

The planetary gear mechanism constituting differential means for moving two spindles as herein set forth and not limited to a chuck and useful in other relations, is claimed in my copending application 353,367, filed April 8, 1929.

I claim:—

1. A chuck comprising a body having two pairs of radial guide ways, a jaw member movable in each guide way, pairs of levers supported in said body independently of each other and engaging said jaw members to move them, two pairs of racks movable longitudinally of the axis of the chuck, one pair racks engaging each pair of levers to move it independently of the other pair.

2. A chuck such as set forth in claim 1, in which one pair of racks slides upon the other pair of racks.

3. A chuck such as set forth in claim 1 provided with means for adjusting the racks while the chuck is rotating.

4. A chuck as set forth in claim 1 provided with two concentric spindles with one pair of racks carried by each spindle.

5. A chuck comprising a body with pairs of independent jaws, a hollow main spindle, two concentric jaw operating spindles mounted therein, and differential equalizing means for moving said concentric spindles longitudinally at different rates with respect to the main chuck spindle.

6. A chuck body and spindle, an extension screwed on to the end of said spindle and having a flange, a guide frame for said spindle extension, two spindles movable longitudinally within said chuck spindle, and differential mechanism positioned longitudinally partly by said flange and partly by said guide frame for moving said longitudinally movable spindles and pairs of jaws in the body operated by said latter spindles.

7. A chuck as set forth in claim 6, having a sleeve in threaded engagement with each of said longitudinally movable spindles and planetary pinions having driving connection with said sleeves.

8. A chuck body and spindle, a stationary housing for one end of said spindle, an inner spindle, a tube between the two spindles, sleeves having threaded engagements with the inner spindle and the tube, an annular gear connected to each sleeve, spur gears concentric with said annular gears, a pair of planetary pinions on a common shaft meshing with said spur and annular gears and means for rotating one spur gear with respect to the other and jaws in the body operated by said tube and said inner spindle.

9. A chuck construction comprising a body, two pairs of jaw members guided therein, a hollow spindle supporting said body, a tube slidable in said spindle and having a divided end, oppositely disposed racks on the end of said tube, levers connecting said racks and two of said jaw members, another member slidable in said tube, oppositely disposed racks carried by said member between the racks on the end of said tube and levers connecting said second mentioned racks and the other jaw members.

10. The combination in a chuck of a rotating main body member, a stationary housing for one end thereof, two rotatable jaw actuating members in said housing jaws actuated by said members, annular gear members rotatably supported in said stationary housing and having clutch engagement with said actuating members, spur gears concentric with said annular gear members, a pair of planetary pinions on a common shaft meshing between said spur gears and said annular gear members, one of said spur gears being secured to a part of said housing and means for rotating the other spur gear.

11. A chuck spindle having an extension connected thereto by a screw thread and having a flange, a housing for said extension, an actuator having a web adjacent the flange on the extension, a second flanged actuator beyond the first actuator, split rings on each side of said web for holding the flanges on the extension and on the second actuator respectively and jaw operating tubes within the chuck spindle moved by said actuators and jaws actuated by said tubes.

12. A chuck spindle in two parts, a main housing, an extension housing detachably secured to the main housing, two actuators within said housing, planetary differential mechanism for operating said actuators, a cap removably secured to said extension housing and connected to one element of said mechanism and means for rotating another element of said mechanism and jaw operating mechanism driven by said actuators and jaws actuated by said mechanism.

13. A hollow chuck spindle, two rotatable actuators, a housing and a cap supporting said spindle, and one of said actuators, a spur gear mounted on the other actuator, a second spur gear connected to said cap, annular gears connected to said actuators and a pair of planetary pinions on a common shaft meshing with said spur and annular gears and travelling between said cap and the adjacent actuator and jaw operating tubes within the chuck spindle driven by said actuator and jaws actuated by said tubes.

14. A chuck comprising a body having a central guide recess and two pairs of radial guideways, jaw members slidable in the guideways, rack members slidable on each other and in said guide recess and levers pivoted in said body and connecting said racks to said jaw members and concentric spindles slidable one inside of the other and connected to said rack members and means for actuating said spindles independently of each other.

15. In a chuck, a body, a number of pairs of jaws supported in said body to move radially thereof, each pair movable independently of another pair, concentric tubular members movable longitudinally with respect to each other and to said chuck body, leverage connections between said tubular members and the jaws of the pairs of jaws, said connections being operable independently of each other.

16. A chuck comprising a body, pairs of jaws carried thereby, each pair being movable independently of the other pair, a hollow spindle for supporting and rotating said chuck body, two jaw operating tubes geared to said pairs of jaws and mounted within said chuck spindle and adapted to be moved longitudinally of said chuck spindle, independently of each other, a rotatable actuator geared to each of said jaw operating tubes, a control member corresponding to each of said actuators, a planetary gear train connecting said control members and said actuators, and means for rotating one of said control members relative to the other control member while the chuck is rotating.

LUCIUS E. WHITON.